(12) United States Patent
Wild et al.

(10) Patent No.: US 11,119,576 B2
(45) Date of Patent: Sep. 14, 2021

(54) USER INTERFACE AND METHOD FOR CONTACTLESSLY OPERATING A HARDWARE OPERATING ELEMENT IN A 3-D GESTURE MODE

(71) Applicant: VOLKSWAGEN AKTIENGESELLSCHAFT, Wolfsburg (DE)

(72) Inventors: Holger Wild, Berlin (DE); Mark Peter Czelnik, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 516 days.

(21) Appl. No.: 15/503,295

(22) PCT Filed: Feb. 9, 2015

(86) PCT No.: PCT/EP2015/052601
§ 371 (c)(1),
(2) Date: May 16, 2017

(87) PCT Pub. No.: WO2015/121187
PCT Pub. Date: Aug. 20, 2015

(65) Prior Publication Data
US 2017/0242491 A1    Aug. 24, 2017

(30) Foreign Application Priority Data
Feb. 17, 2014  (DE) .................... 10 2014 202 834.5

(51) Int. Cl.
G06F 3/01      (2006.01)
G06F 3/023     (2006.01)
(52) U.S. Cl.
CPC ............. *G06F 3/017* (2013.01); *G06F 3/023* (2013.01)

(58) Field of Classification Search
CPC .................................. G06F 3/017; G06F 3/023
See application file for complete search history.

(56) References Cited

U.S. PATENT DOCUMENTS 7,437,488 B2    10/2008  Ito et al.
2005/0251746 A1* 11/2005  Basson .................. G06F 3/012
                                                                        715/708
(Continued)

FOREIGN PATENT DOCUMENTS

DE       10349568 A1   5/2004
DE    102005005411 A1   8/2006
(Continued)

OTHER PUBLICATIONS

German Patent Appln. No. 1020142028345. Search Report (dated Jan. 27, 2015).
(Continued)

*Primary Examiner* — Afroza Chowdhury
(74) *Attorney, Agent, or Firm* — Loza & Loza, LLP; Peter Zura

(57) ABSTRACT

User interface and method for contactlessly operating a hardware operating element in a 3-D gesture mode. The invention proposes a user interface and a method for contactlessly operating a hardware operating element (12), called "button" below, of a user interface in a 3-D gesture mode, by means of which the user interface can be operated using gestures freely carried out in space, called 3-D gestures below. The method comprises the steps of: —detecting (100) a user's hand (4), —assigning (200) the hand (4) to an area of the user interface (I) assigned to the button (12), and, in response thereto, —outputting (300) a suggestion (14, 16) to the user.

20 Claims, 11 Drawing Sheets

(56) References Cited

U.S. PATENT DOCUMENTS

| | | | |
|---|---|---|---|
| 2008/0165153 A1* | 7/2008 | Platzer | G06F 1/1626 345/173 |
| 2009/0273563 A1* | 11/2009 | Pryor | B60K 35/00 345/157 |
| 2012/0038496 A1 | 2/2012 | Edwards | |
| 2012/0260164 A1 | 10/2012 | Scheufler et al. | |
| 2013/0169568 A1* | 7/2013 | Park | G06F 3/0488 345/173 |
| 2013/0227482 A1* | 8/2013 | Thorsander | G06F 3/0482 715/821 |

FOREIGN PATENT DOCUMENTS

| | | |
|---|---|---|
| DE | 102006037156 | 9/2007 |
| DE | 102006037156 A1 | 9/2007 |
| DE | 102006059032 | 6/2008 |
| DE | 102009008041 A1 | 8/2010 |
| DE | 102009038895 A1 | 9/2010 |
| DE | 102011116187 A1 | 4/2013 |
| DE | 102012000263 A1 | 7/2013 |
| EP | 2741232 A2 | 6/2014 |
| WO | WO200130051 | 4/2001 |
| WO | WO2012115307 A1 | 8/2012 |
| WO | WO2013101074 | 7/2013 |
| WO | WO2014000060 A1 | 1/2014 |

OTHER PUBLICATIONS

PCT/EP2015/052601. Int'l Search Report & Written Opinion (dated May 12, 2015).

* cited by examiner

USER INTERFACE AND METHOD FOR CONTACTLESSLY OPERATING A HARDWARE OPERATING ELEMENT IN A 3-D GESTURE MODE

RELATED APPLICATIONS

The present application is a national stage application under 35 U.S.C. § 371, and claims priority to International Patent Application No. PCT/EP2015/052601, filed Feb. 9, 2015 to Wild et al., titled "User Interface and Method for Contactlessly Operating A Hardware Operating Element In A 3-D Gesture Mode," the contents of which is incorporated by reference in its entirety herein.

TECHNICAL FIELD

The present disclosure relates to a user interface and a method for contactlessly operating a hardware operating element ("button," "slide control," "rotary/push adjuster," etc.) of a user interface. In particular, the present disclosure relates to a novel method for contactlessly interacting with such a button.

BACKGROUND

The concept of gesture operation in free space has increasingly been gaining in popularity. Users can communicate with human-machine interfaces by means of such gestures without ever establishing physical contact with the input apparatus. Optical and/or infrared-based systems, for example, recognize the gesture and convert the same into control commands. Gesture operation concepts to date have been limited to buttons visualized via software and other interactive panels.

DE 10 2012 000 263 A1 discloses a method and a device for operating functions inside a vehicle by means of gestures that are performed in three-dimensional space. The gesture operation is activated, when a detection apparatus that is disposed in the roof area of the vehicle detects a hand of the user for the length of a first predetermined time period inside a valid detection area.

DE 10 2006 037 156 A1 describes an interactive operating device that enables the gesture operation of a graphic content that is visualized on a display device. The graphic content for activating a function that is associated with this content is visualized in an optimized fashion as a function of the determined user intent. For example, upon approaching a button, said button is visualized as enlarged.

DE 10 2009 008 041 A1 discloses a method for operating a motor vehicle by means of a touch screen that provides for a proximity sensor means for detecting a gesture intended for executing and/or initializing the performance of a function of the motor vehicle. The function of the motor vehicle is executed, when a hand gesture is performed in the vicinity of the touch screen without actually touching the same.

However, the previously described prior art is inadequate in fully exploiting the technical possibilities of this modality. It is, therefore, an object of the present invention to satisfy the aforementioned need.

SUMMARY

According to the various illustrative embodiments disclosed herein, various techniques and technologies are disclosed for contactlessly operating a hardware operating element. In some illustrative embodiments, such a hardware operating element (for the sake of simplification, below often referred to as a "button") is understood as an element whose appearance is not substantially determined by a screen located behind the same, as is the case with transparent surfaces that are sensitive to touch, so-called touch screens. Operating elements of this kind are envisioned in a great number and many varieties inside vehicles to facilitate, for example, adjusting seat settings, climate control, music replay settings, etc. The known configurations, such as "scanner," "push button," "rotary adjuster", "rotary-push adjuster" and "slide control" ("slider"), are only mentioned as examples. In some illustrative embodiments, a user interface may be configured in such a way that, when in 3-D gesture mode, it may detect gestures that are performed freely in space ("3-D gestures") and accepts them as control commands.

To this end, the hand of a user may be detected by a sensory means that may include, but is not limited to, optical and/or infrared-based systems. The sensor may be configured with a detection area where it is able to detect gestures, which are performed by the hand of the user, with a sufficient level of resolution to be able to classify and assess a given gesture in relation to predefined references. In some illustrative embodiments, the hand may be assigned to an area of the user interface that is assigned to said button. In other words, a partial area of the detection area that is monitored by a sensor means is assigned to the button, so that it is possible to access a function that is associated with the button via the partial area of the detection area.

BRIEF DESCRIPTION OF THE DRAWINGS

Various illustrative embodiments are described in detail below in reference to the enclosed accompanying drawings. In these drawings.

DETAILED DESCRIPTION

Figure 1:
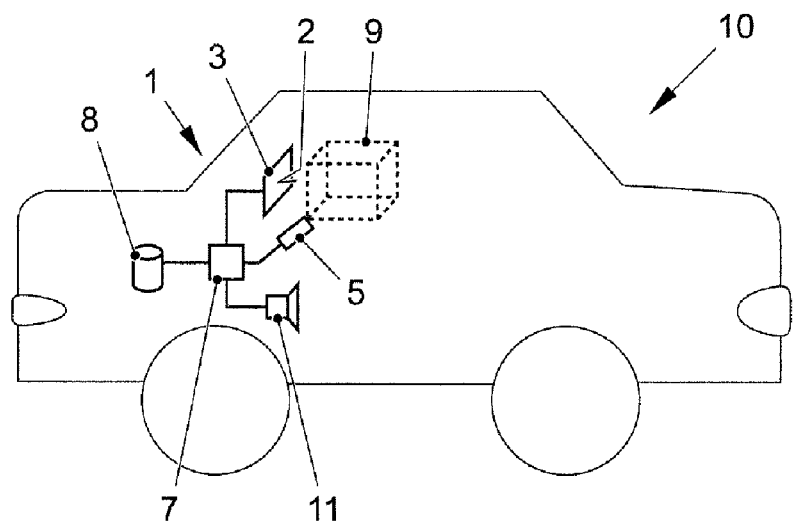
FIG. 1 is a schematic overview of the components of an embodiment of a user interface incorporated in a means of transportation according to an illustrative embodiment.

In some illustrative embodiments, a 3-D detection area as described herein, and an area that is visualized on a display of the graphic user interface correspond to each other in such a way that each area on the graphic user interface is matched with a respective partial area of the detection area that is monitored by a sensor means. In this case, a button may also be assigned a corresponding area on the graphic user interface. If the hand is assigned to a button that is assigned to the area (of the detection area or the graphic user interface, respectively), the user may receive a suggestion in the form of audible and/or visible indicia. In other words, the user is informed as to the fact that his hand has reached that area of the detection area which is assigned to the button. This way, different operating steps are enabled that will be described in detail in the present description of the invention. Under some illustrative embodiments, the user may be informed if a touchless interaction with the button can already take place at the current time, or if the hand of the user must first penetrate the area assigned to the button.

If the user has his or her hand arranged in the area that is assigned to the button, as described herein, the user can perform a gesture to initiate a function that is assigned to said button. Such a gesture can be, for example, a tap gesture (also "click gesture"), a drag and/or drop gesture, a long press gesture, and the like. The function that is associated with the button can be, for example, the calling up of a menu item (e.g., "navigation," "radio," "onboard computer," "traffic alerts," and the like). This way, the user does not have to physically touch the button, nor does the user have to leave a comfortable seated position in order to initiate the function that is associated with the button. It is thereby possible to increase the safety of a means of transportation, such as a vehicle, that is equipped according to the present disclosure, as the seated position of the driver requires less drastic changes in order to operate the button.

In some illustrative embodiments, the area of the detection area that is assigned to the button can be located along an edge area of the detection area. Typically, such an area may also be assigned to an edge area of a graphic user interface that is visualized on a display unit. The arrangement may be advantageous, since buttons typically are not arranged within the delimitations of a display unit (screens are always closed areas), while, however, display units are often surrounded by hardware operating elements, creating a particularly intuitively detectable arrangement. The assignment is rendered especially intuitive if only the sections of the edge area of the display unit that are arranged at the height of the button are assigned to the observer, and if other edge areas are assigned to other buttons. This results in the possibility, in particular, of operating a plurality and/or all buttons that line the display unit by means of 3-D gestures according to the invention.

The suggestion can be output, for example, on the display unit ("screen") by optically highlighting the area that is assigned to the button. For example, indicating an optical representation of the button on the screen is also possible. Preferably, this can be carried out inside an area that is assigned to the button and outside of said area, wherein other screen content is optically superimposed. Alternatively or additionally, the suggestion can be output by means of an electroacoustic converter. Alternatively or additionally, the button itself can be optically highlighted. The prior art provides inexpensive and operationally reliable buttons that call up given predefined functions using background illumination provided by means of light-emitting diodes (LEDs). The button can be optically highlighted, for example, by changing the color and/or intensity of the light thereof. The latter can be achieved, e.g., by modulating the energy supply for generating a blinking signal.

After a predefined time period has expired, it is possible to discontinue the suggestion and/or reverse the faded in optical representation of the button. It is preferred that the optical representation of the button is removed in the reverse order of how it was faded in previously. In other words, if the button is arranged to the right of the display unit, the optical representation can be moved towards the left and into the graphic content of the display unit, and—upon expiration of the predefined time period, or upon the hand leaving the area of the user interface assigned to the button—it can be moved towards the right.

A wide plurality of design options is available for the optical visualization of the optical representation, which will be discussed below in terms of selected details. The optical representation, for example, can be superimposed by a (partially) transparent overlap of the other graphic content of the display unit. This helps in highlighting the temporary nature of the faded in element. Alternatively and additionally, the optical representation can be animated featuring therein different transparency values, wave-like motions and/or locally changing shine or "glow" properties. In addition to the aforementioned design options that serve to emphasize the temporary nature of the optical representation, it is also possible to devise an optically pleasing design of the representation.

According another illustrative embodiment, a user interface is disclosed that includes a sensor for detecting gestures that are performed freely in space. Here, a display unit (e.g., as a matrix display or "screen") as well as an evaluation unit are configured for recognizing a plurality of gestures among the signals of the sensor. The evaluation unit can be configured, for example, as an electronic control device and comprise a programmable processor. A hardware operating element that may be disposed adjacent to the display unit may be populated by at least one predefined function. In one example, a touch-sensitive operating surface that is configured to be superimposed over the display unit is not understood as a "button" in the context of the present disclosure. In certain illustrative embodiments, the user interface is set up such that, upon responding to a presence in a 3-D detection area, which is assigned to a button, the evaluation unit detects the presence, and the user interface outputs a suggestion to the user.

According to another illustrative embodiment, a user end device may be configured as a mobile electronic device and may be configured to include electronic wireless communications devices (smartphones, laptops, netbooks, tablets, etc.). A user interface may be integrated in the user end device that serves for setting up the user end device to perform various methods disclosed herein.

In some illustrative embodiments, a computer program product (e.g., a data storage means) may be configured with stored instructions that enable a programmable processor of a user interface to execute the methods and techniques disclosed herein. The computer program product can be designed as a CD, DVD, Blue Ray disc, flash memory, hard drive, RAM/ROM, cache, etc.

In some illustrative embodiments, a means of transportation, such as a passenger car, van, truck, terrestrial and/or marine vehicle. The means of transportation comprises a user interface according to the present disclosure, wherein the display unit is designed as a central screen that is fixedly incorporated in the dashboard of the means of transportation and/or as a combination instrument of the means of transportation. The features, combinations of features and any advantages resulting therefrom are embodied in this manner by the means of transportation according to the present disclosure.

FIG. 1 shows a passenger car 10 as a means of transportation having a screen 3 that is incorporated as display unit of a user interface 1 in the dashboard under an illustrative embodiment. A sensor 5 may be arranged underneath the screen 3 that creates a detection area 9 in the space in front of the screen 3. A loudspeaker 11 may be provided for outputting user suggestions as discussed herein. Data storage 8 may be provided for the purpose of storing predefined references for recognizing the gestures. The aforementioned components may be linked by IT means to an evaluation unit, which is in form of an electronic control device 7. The electronic control device 7 is further equipped for visualizing graphic content 2 in form of a menu on screen 3.

Figure 2:
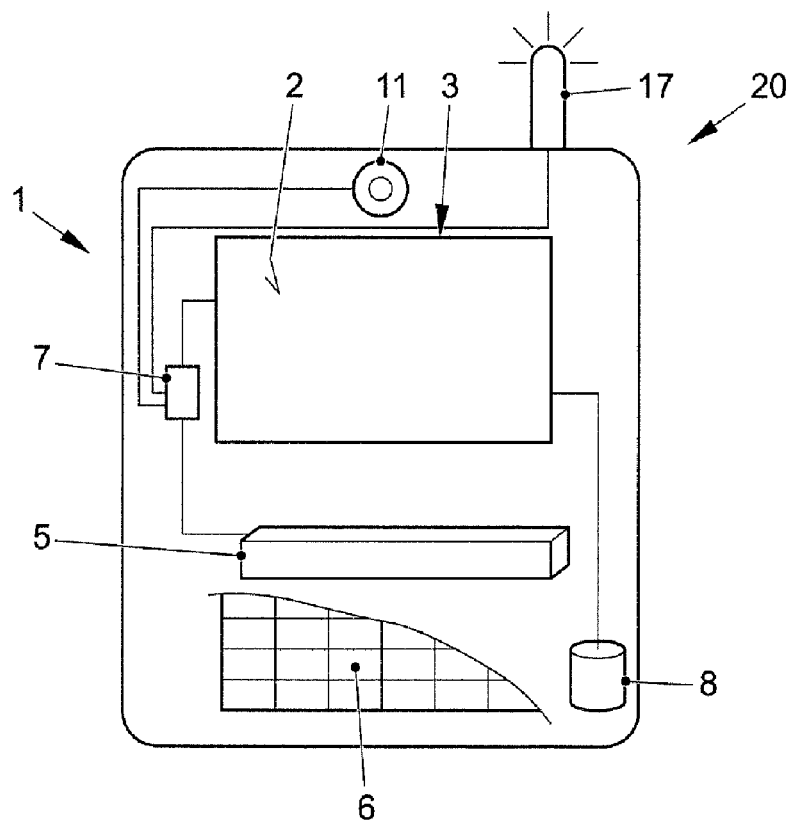
FIG. 2 is a schematic overview of components of a user interface incorporated in a user end device according to an illustrative embodiment.

FIG. 2 shows an overview of the components of an embodiment of a user interface according to an illustrative embodiment of a user end device in form of a smartphone 20. A keypad 6 of the smartphone 20 is partially exposed to facilitate visual access to the underlying components. Screen 3 of the smartphone 20 depicts the display unit, a microprocessor 7, the evaluation unit, a flash storage 8, the storage means, a loudspeaker 11 and a signal donor of the user interface 1. In addition, an infrared LED strip 5 may be connected as a sensor via IT means to the microprocessor 7. The same is also coupled to an antenna 17 in order to communicate with a wireless infrastructure and/or other user end devices.

Figure 3:
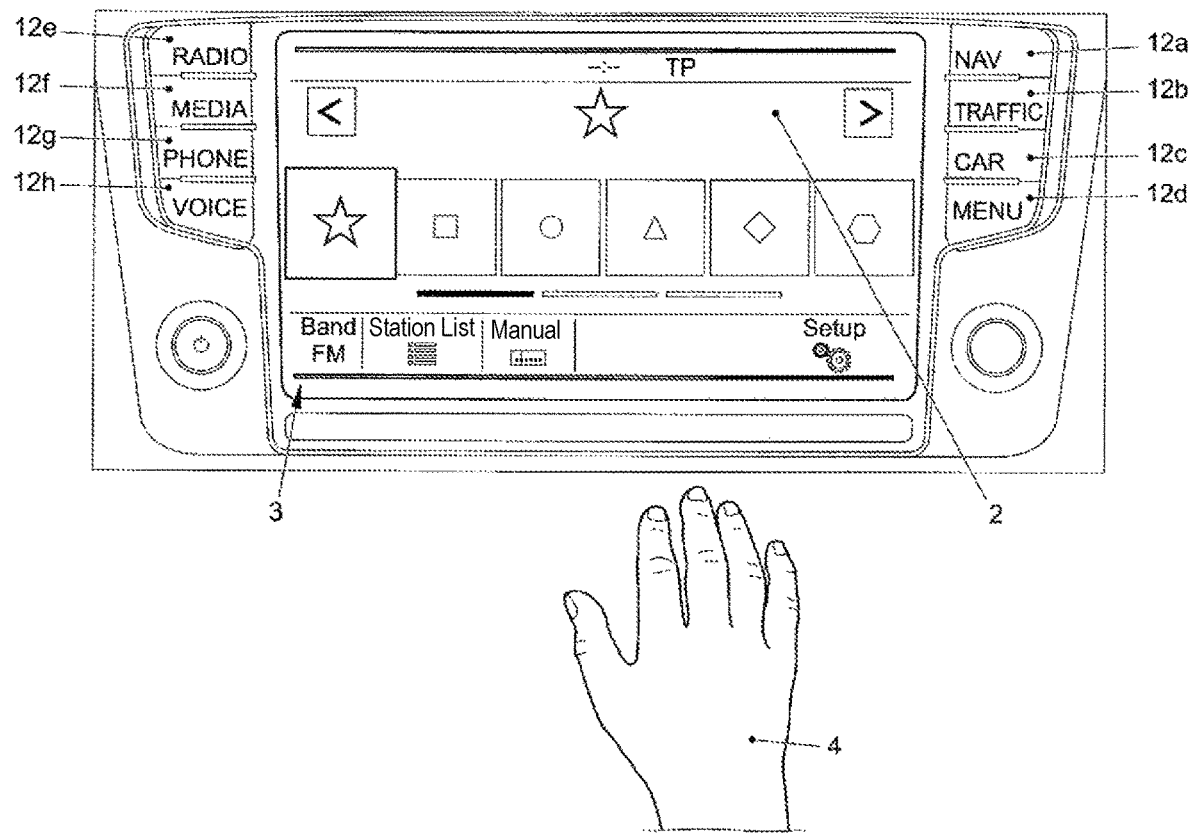
FIG. 3 is a representation of an operating step of a user interface according to an illustrative embodiment.

FIG. 3 shows a screen 3 as a display unit where a menu 2 is visualized for selecting a radio station under an illustrative embodiment. In this example, a hand 4 of a user is located in front of the screen 3 inside the detection area 9 of the sensor 5 (both not shown) by means of which the user wishes to perform a 3-D gesture for operating the navigation.

Figure 4A:
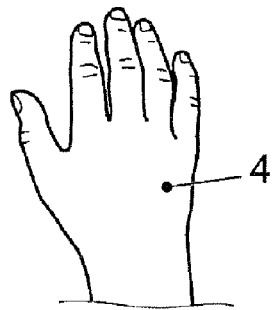
FIG. 4 is a selection of possible hand gestures for operating the user interface according to an illustrative embodiment.
Figure 4B:
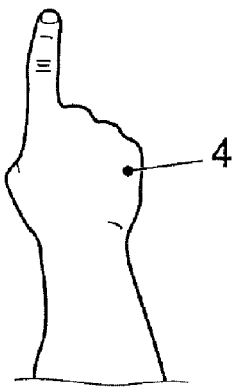
Figure 4C:
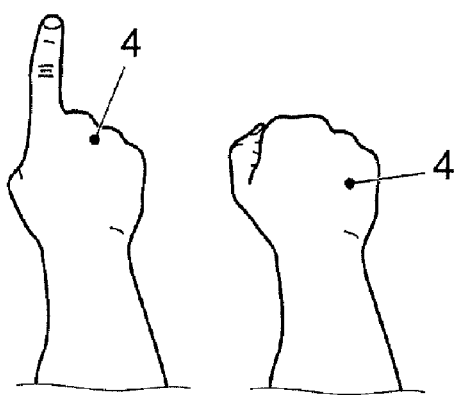

FIG. 4 shows various hand positions and gestures for interacting with a user interface 1 under an illustrative embodiment. As seen in the partial figure "a" in this example, the open palm of the hand 4 is pointed in the direction of the screen 3. The fingers of the hand 4 are extended and slightly spread apart. Partial figure "b" depicts an indicator gesture of the hand 4 where only the index finger of the hand 4 is extended, whereas the remaining fingers are brought into a fist. Partial figure c illustrates a tap and/or click gesture where the index finger of the hand 4 is initially extended but then folded in the direction of the screen 3 for activating a function that is associated with a button.

Figure 5:
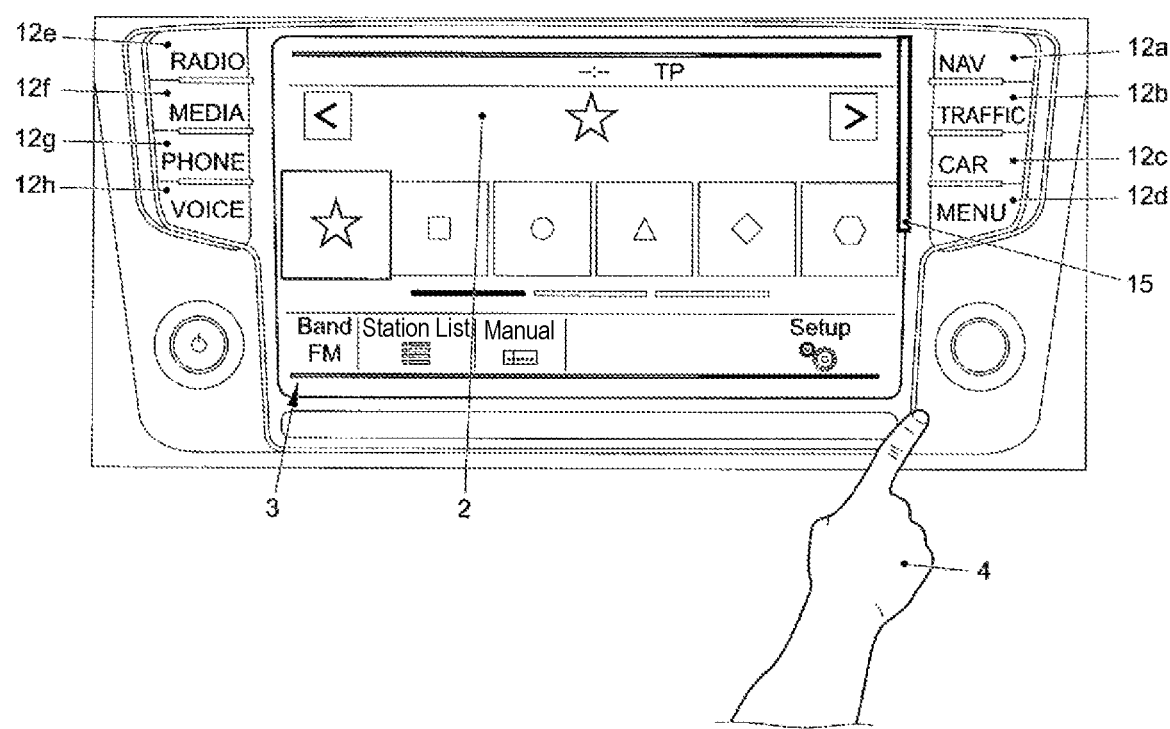
FIG. 5 is a representation of an operating step for contactlessly operating a button under an illustrative embodiment.

FIG. 5 shows the screen 3 of a user interface, where a menu 2 for selecting a radio station is visualized as graphic content under an illustrative embodiment. The hand 4 of the user in this example is located in a right upper edge area of the detection area (not shown). An area that is marked by a red box 15 is associated with this area on the screen 3. Four buttons 12a, 12b, 12c, 12d are arranged to the right of said area. The buttons 12a, 12b, 12c, 12d are implemented as push buttons and assigned to the functions "navigation," "traffic alerts," "onboard computer" and "main menu." Four further buttons 12e, 12f, 12g, 12h are mirror-symmetrically arranged to the left of the screen 3 and assigned to the functions "radio," "media," "phone" and "voice communication."

Figure 6:
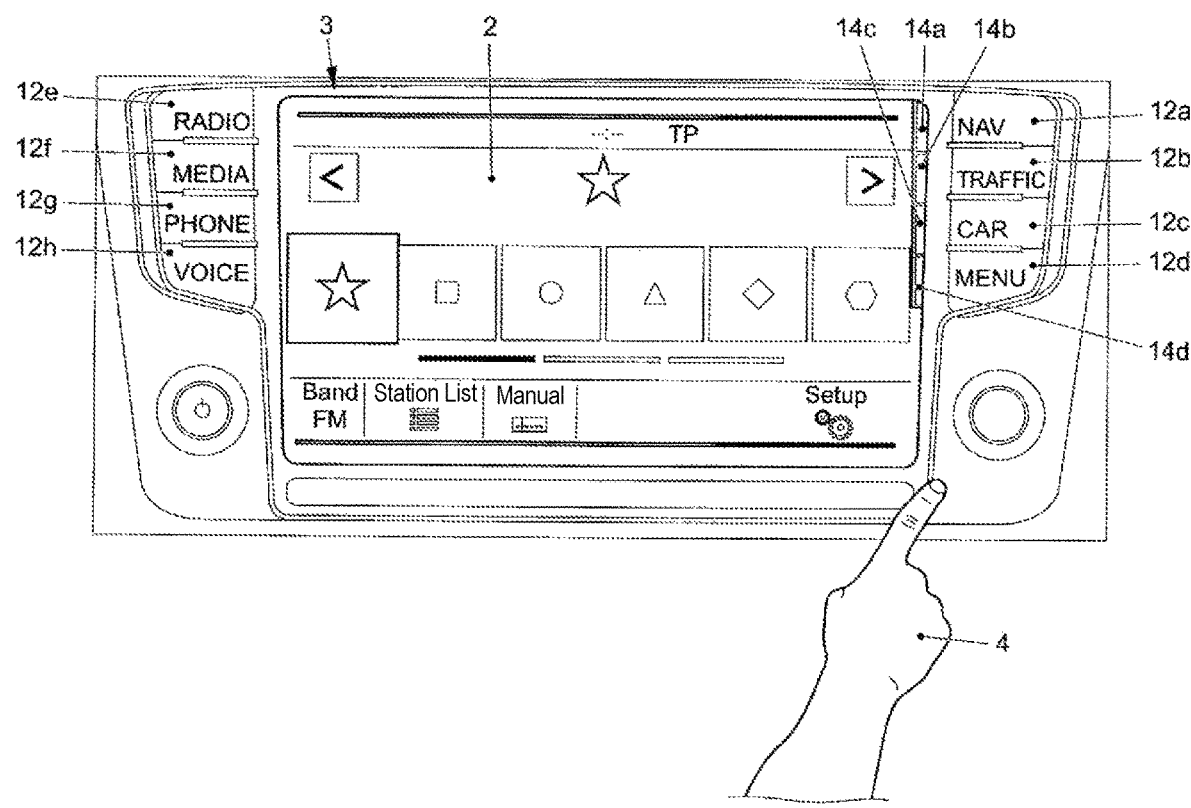
FIG. 6 is a representation of an operating step that follows the step as described in FIG. 5 under an illustrative embodiment.

FIG. 6 shows one option for outputting a notification to the user informing him of the fact that the user's hand 4 is remaining in an area of the user interface that is assigned to the buttons 12a, 12b, 12c, 12d. Responding to the same, the evaluation unit (not shown here) starts horizontally inserting an optical representation 14a, 14b, 14c, 14d of the buttons 12a, 12b, 12c, 12d into the menu or superimposing the same over menu 2, respectively.

Figure 7:
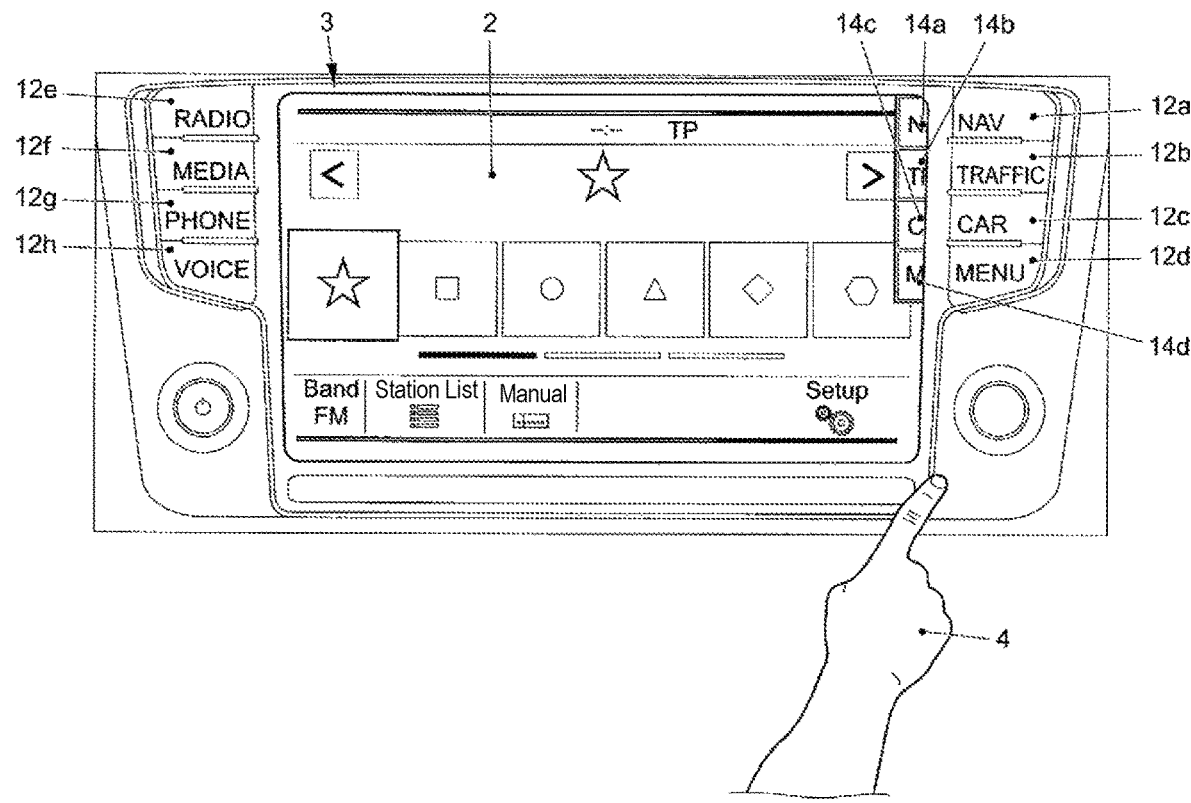
FIG. 7 is a representation of an operating step that follows the step as described in FIG. 6 under an illustrative embodiment.

FIG. 7 show the arrangement as depicted in FIG. 6, at the stage of an advanced insertion process under an illustrative embodiment.

Figure 8:
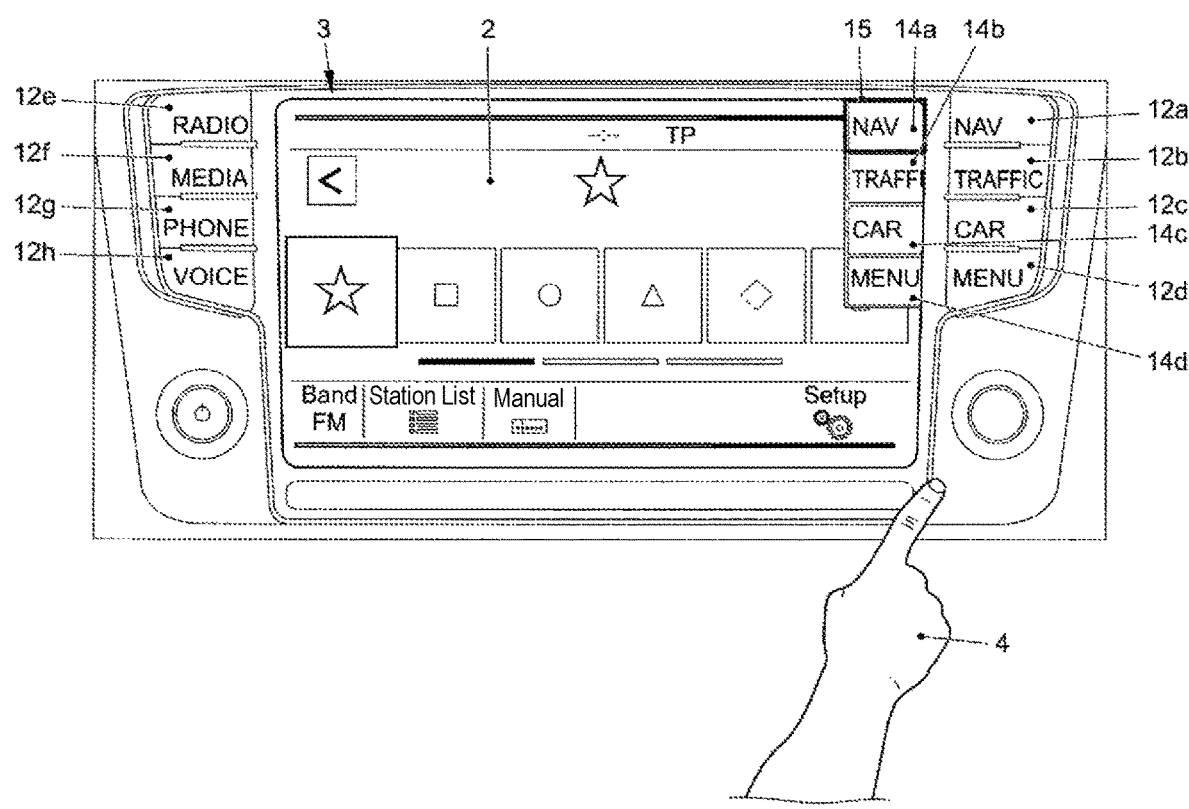
FIG. 8 is a representation of a user interaction with an optical representation of a first button; under an illustrative embodiment
Figure 9:
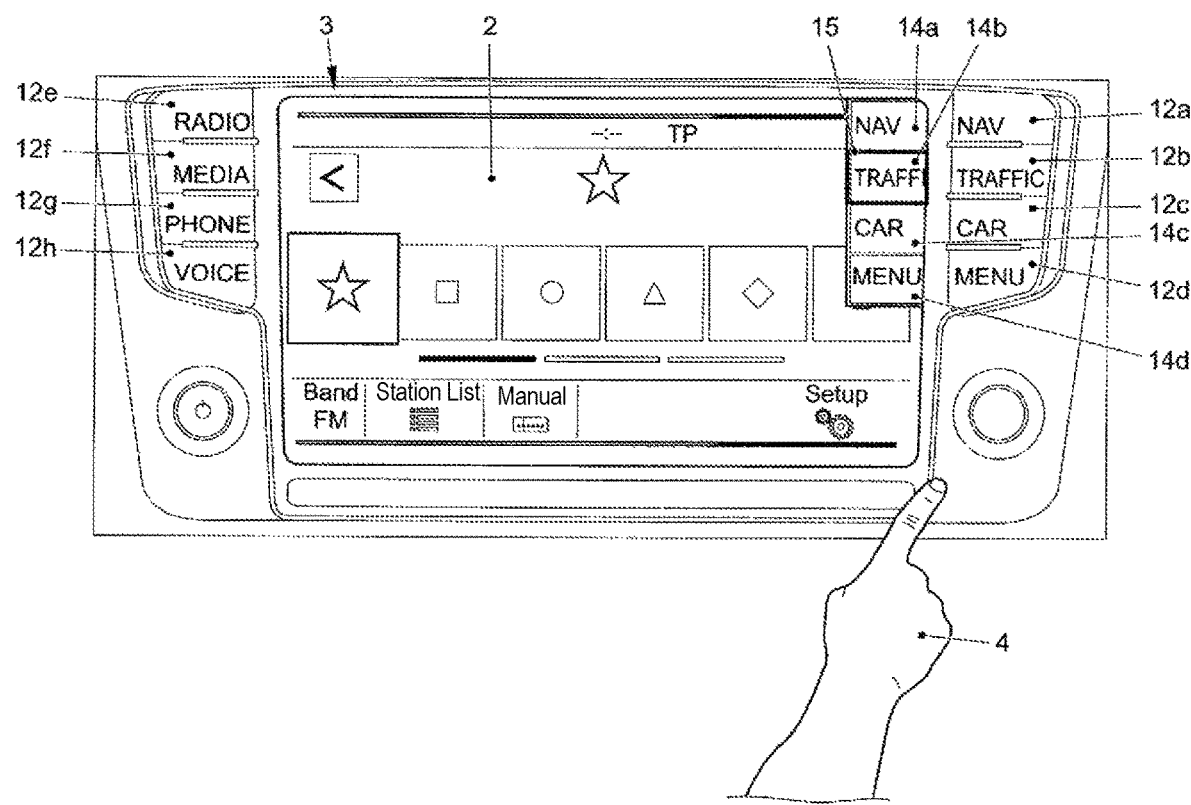
FIG. 9 is a representation of a user interaction with an optical representation of a second button under an illustrative embodiment.

FIG. 8 shows the arrangement as depicted in FIG. 7 after the conclusion of the insertion process. The representations 14a, 14b, 14c, 14d and the associated buttons 12a, 12b, 12c, 12d are located, respectively, at the same level of the edge of the screen in one example. The top button 12a is symbolized by the optical representation 14a. To interact with the button 12a, the user brings his hand 4 to a partial area of the detection area that is assigned to the optical representation 14a, as illustrated by a red box 15. The red box 15 therein symbolizes only a process, which is also referred to as "mouse-over-event" in the field of graphic user interfaces. Any and all measures that are known in the art can be used for optically highlighting buttons for the purpose of optically confirming the optical representation 14a. To select the function "navigation" that is associated with the optical representation of 14a or button 12a, respectively, the user is now able to perform a tap or a click gesture, respectively, using his hand 4. Alternatively, the user can downwardly modify the position of his hand 4, whereby the view corresponding to traffic alerts, as depicted in FIG. 9, is achieved.

Figure 10:
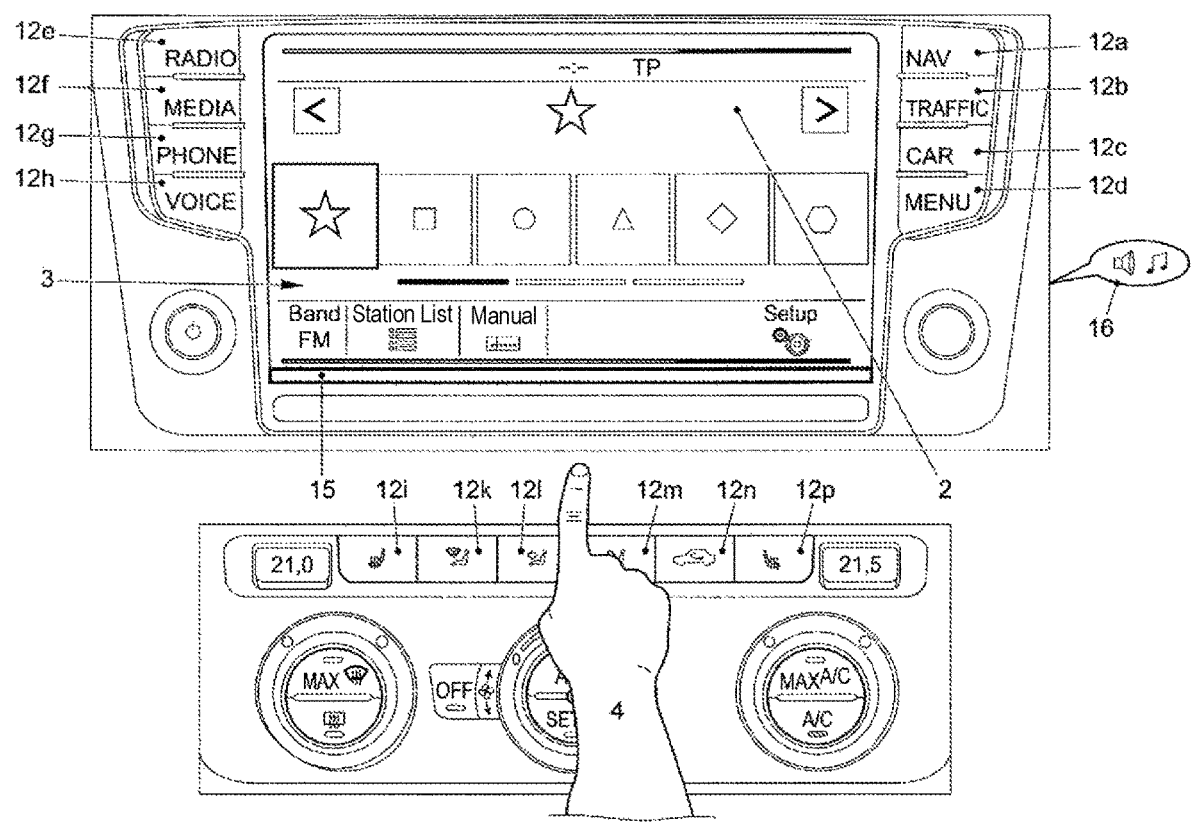
FIG. 10 is a representation of an operating step for contactlessly operating a button of a user interface under an illustrative embodiment.

FIG. 10 shows a view of an operating step with a user interface under an illustrative embodiment. The user has placed his hand 4 in a bottom area of the detection area (not shown), which is assigned to a bottom area of the menu 2, screen 3. A red box 15 optically highlights this area. The buttons 12i, 12k, 12l, 12m, 12n and 12p that are arranged underneath the screen 3 are assigned to a climate control system. A loudspeaker/music note icon 16 illustrates the output of an acoustic suggestion that informs the user that his hand 4 has entered the identified area.

Figure 11:
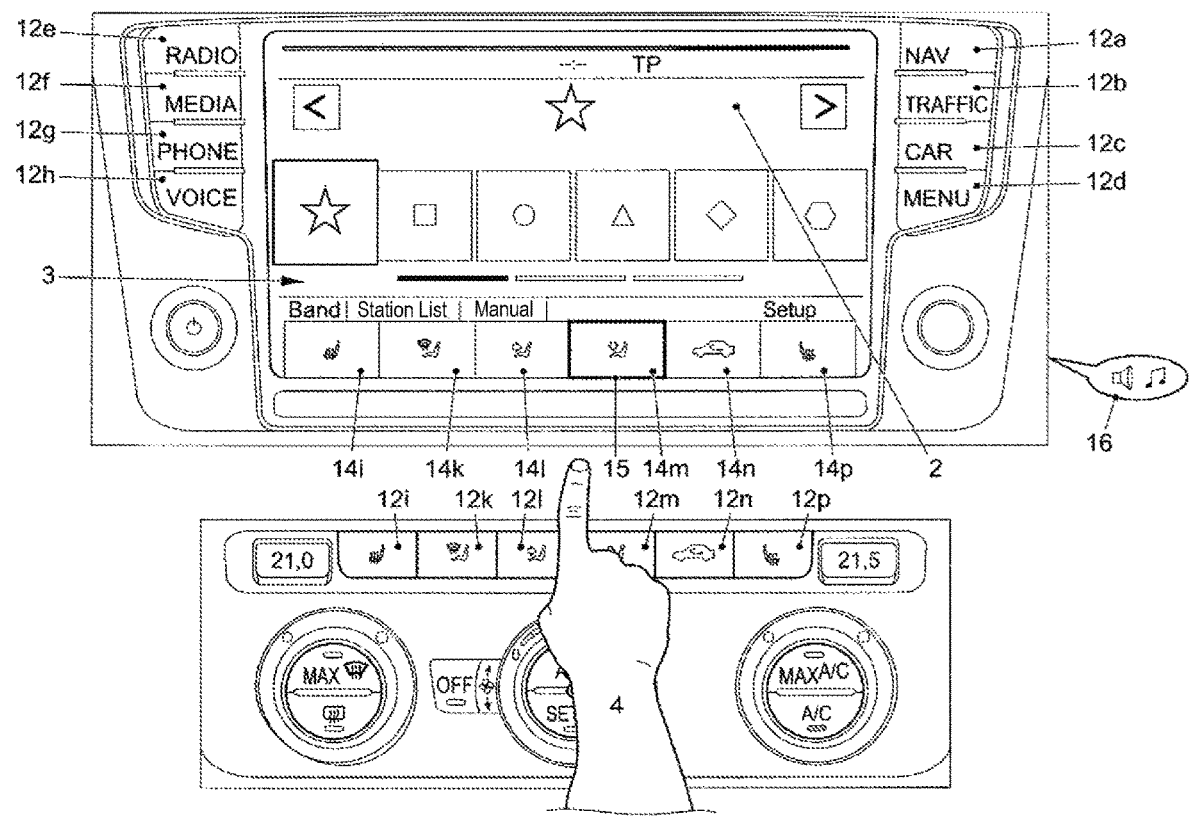
FIG. 11 is a representation of an operating step that follows the step as described in FIG. 10 under an illustrative embodiment.

FIG. 11 shows the result of what happens when the hand 4 of the user remains in the area that has been highlighted in FIG. 10. In doing so, the hand 4 is arranged in a partial area of the detection area (not shown) that is assigned to the air distribution in the foot area (see red box 15). The option of a corresponding functional call-up is once again announced by the output of an acoustic signal (symbolized by the loudspeaker/music note icon 16). By performing a horizontal motion, the hand 4 of the user is also able to operate optical representations 14i, 14k, 14l, 14n or 14p in order to control the climate control functions associated therewith. Naturally, it is understood that a tactile operation of the hardware operating button 12i, 12k, 12l, 12m, 12n, 12p is not affected by this option.

Figure 12:
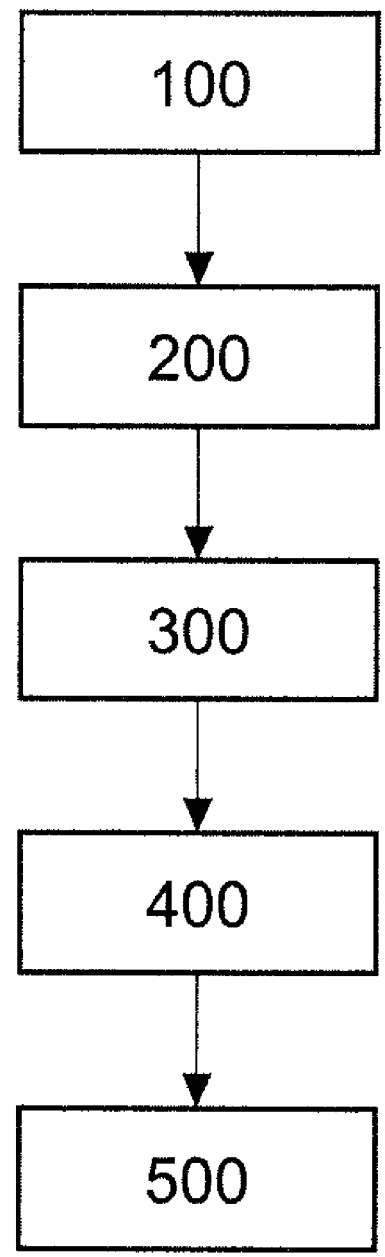
FIG. 12 is a flow chart illustrating the steps of a method according to under an illustrative embodiment.

FIG. 12 shows the method steps of an embodiment of a method according to an illustrative embodiment. In step 100, the hand of the user is detected by sensor means; in step 200, it is assigned to an area of a user interface that is assigned to said button. In other words, it is determined that the hand is located in an area as is envisioned for the contactless operation of the button according to the embodiment. In response thereto, in step 300, a suggestion is output to the user informing the user that his hand is located in the area for contactlessly operating the button. To this end, an optical representation of the button appears on the screen of the user interface at the level of the button. In step 400, a predefined gesture of the user is detected in this area, which is linked to a function that is associated with the button. This gesture can be, for example, a tap or click gesture, respectively, for actuating the representation. In step 500, responding to the predefined gesture, the function that is associated with the button is called up. As a result, an operating element provided per design for hardware and tactile operations was ultimately used solely by means of performing 3-D gestures for the purpose of calling up an associated function.

Even though the aspects according to the invention and advantageous embodied examples thereof have been described in detail based on the embodiments as explained in connection with the enclosed figures in the drawings, a person skilled in the art will perceive modifications and combinations of features of the depicted embodiments without exceeding the scope of the present invention, the scope of protection of which is specified by the appended claims.

LIST OF REFERENCE SIGNS

1 User interface
2 Menu
3 Screen
4 Hand of the user
5 Infrared LED strip/sensor
6 Keypad
7 Electronic control device/processor
8 Data storage
9 Detection area
10 Passenger car
11 Loudspeaker
12 Button
14 Optical representation
15 Red box
16 Acoustic suggestion
17 Antenna
20 Smartphone
100-500 Method steps

The invention claimed is:

1. A user interface for a vehicle, comprising
a processing apparatus;
a display unit, operatively coupled to the processing apparatus;
a hardware operating element, operatively coupled to the processing apparatus, wherein the hardware operating element is configured to activate and/or control at least one function of the vehicle;
a sensor, operatively coupled to the processing apparatus, the sensor being configured to detect hand gestures that are performed in three-dimensional (3D) space in a detection area in proximity to the sensor; and
an evaluation unit, operatively coupled to the sensor, wherein the evaluation unit is configured to recognize a first hand gesture, assigned to the hardware operating element,
wherein, in response to the recognized first hand gesture, the processing apparatus is configured to generate a suggestion comprising one or more of
displaying the function of the hardware operating element on the display unit,
activating an electroacoustic converter, and/or
activating a lighting element, configured on the hardware operating element,
and wherein the evaluation unit is configured to recognize a second hand gesture in response to generating the suggestion, the processing apparatus being configured to activate and/or control the at least one function of the vehicle, based on the recognized second hand gesture.

2. The user interface according to claim 1, wherein the detection area comprises an edge area of the display.

3. The user interface according to claim 1, wherein the hardware operating element comprises a button located adjacent to the processing apparatus.

4. The user interface according to claim 3, wherein the processing apparatus is configured to display the function of the hardware operating element on the display unit by fading an optical representation of the hardware element on the display screen.

5. The user interface according to claim 3, wherein the processing apparatus is configured to display the function of the hardware operating element on the display unit by fading an optical representation of the hardware element in an edge area of the display screen that is closest in proximity to the hardware element.

6. The user interface according to claim 4, wherein the processing apparatus is configured to terminate the fading of the optical representation after a predetermined period of time.

7. The user interface of claim 1, wherein the evaluation unit is configured to determine that the first hand gesture is no longer being detected after a predetermined period of time, and the processing apparatus is configured to deactivate the suggestion in response thereto.

8. A method for controlling a user interface for a vehicle, comprising
detecting, via a sensor, hand gestures that are performed in three-dimensional (3D) space in a detection area in proximity to the sensor and a hardware operating element configured to activate and/or control at least one function of the vehicle; and
recognizing, via an evaluation unit, a first hand gesture, assigned to the hardware operating element,
generating, via a processing apparatus, a suggestion in response to the recognizing of the first hand gesture, the suggestion comprising one or more of
displaying the function of the hardware operating element on a display unit,
activating an electroacoustic converter, and/or
activating a lighting element, configured on the hardware operating element;
recognizing, via the evaluation unit, a second hand gesture in response to generating the suggestion, the processing apparatus being configured to activate and/or control the at least one function of the vehicle, based on the recognized second hand gesture.

9. The method according to claim 8, wherein the detection area comprises an edge area of the display.

10. The method according to claim 8, wherein the hardware operating element comprises a button located adjacent to the processing apparatus.

11. The method according to claim 10, wherein displaying the function of the hardware operating element on the display unit comprises fading an optical representation of the hardware element on the display screen.

12. The method according to claim 10, wherein displaying the function of the hardware operating element on the display unit comprises fading an optical representation of the hardware element in an edge area of the display screen that is closest in proximity to the hardware element.

13. The method according to claim 11, further comprising terminating the fading of the optical representation after a predetermined period of time.

14. The method of claim 8, further comprising determining that the first hand gesture is no longer being detected after a predetermined period of time, and deactivating the suggestion in response thereto.

15. A user interface for a vehicle, comprising
a processing apparatus;
a display unit, operatively coupled to the processing apparatus;
a hardware operating element, operatively coupled to the processing apparatus, wherein the hardware operating element is configured adjacent to the display unit, and wherein the hardware operating element is configured to activate and/or control at least one function of the vehicle;
a sensor, operatively coupled to the processing apparatus, the sensor being configured to detect hand gestures that are performed in three-dimensional (3D) space in a detection area in proximity to the sensor; and
an evaluation unit, operatively coupled to the sensor, wherein the evaluation unit is configured to recognize a first hand gesture, assigned to the hardware operating element,
wherein, in response to the recognized first hand gesture, the processing apparatus is configured to generate a suggestion comprising two or more of
displaying the function of the hardware operating element on the display unit,
activating an electroacoustic converter, and/or
activating a lighting element, configured on the hardware operating element,
and wherein the evaluation unit is configured to recognize a second hand gesture in response to generating the suggestion, the processing apparatus being configured to activate and/or control the at least one function of the vehicle, based on the recognized second hand gesture.

16. The user interface according to claim 1, wherein the detection area comprises an edge area of the display.

17. The user interface according to claim 1, wherein the hardware operating element comprises a button.

18. The user interface according to claim 3, wherein the processing apparatus is configured to display the function of the hardware operating element on the display unit by fading an optical representation of the hardware element on the display screen.

19. The user interface according to claim 3, wherein the processing apparatus is configured to display the function of the hardware operating element on the display unit by fading an optical representation of the hardware element in an edge area of the display screen that is closest in proximity to the hardware element.

20. The user interface of claim 1, wherein the evaluation unit is configured to determine that the first hand gesture is no longer being detected after a predetermined period of time, and the processing apparatus is configured to deactivate the suggestion in response thereto.

* * * * *